(12) United States Patent
Tanaka et al.

(10) Patent No.: US 8,714,648 B2
(45) Date of Patent: May 6, 2014

(54) VEHICLE SEAT

(75) Inventors: Hideaki Tanaka, Nagoya (JP); Takeshi Morimoto, Tajimi (JP); Yuuichi Hiramatsu, Miyoshi (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 85 days.

(21) Appl. No.: 13/470,502

(22) Filed: May 14, 2012

(65) Prior Publication Data

US 2012/0292971 A1 Nov. 22, 2012

(30) Foreign Application Priority Data

May 18, 2011 (JP) ................................. 2011-111183

(51) Int. Cl.
*B60N 2/20* (2006.01)
(52) U.S. Cl.
USPC ...................................................... 297/378.1
(58) Field of Classification Search
USPC ................ 297/378.12, 378.1, 341, 354.12
See application file for complete search history.

(56) References Cited

U.S. PATENT DOCUMENTS

| | | | | |
|---|---|---|---|---|
| 3,822,914 | A * | 7/1974 | Iida et al. ................. | 297/362.13 |
| 5,788,330 | A * | 8/1998 | Ryan ........................ | 297/378.12 |
| 6,513,875 | B1 * | 2/2003 | Gray et al. ............... | 297/378.14 |
| 7,393,056 | B2 * | 7/2008 | O'Connor ................ | 297/378.12 |
| 2002/0135216 | A1 * | 9/2002 | Hamelin et al. ......... | 297/378.12 |
| 2004/0113477 | A1 * | 6/2004 | Kojima ...................... | 297/378.1 |
| 2006/0181133 | A1 * | 8/2006 | Sugama et al. ............ | 297/378.1 |
| 2006/0273645 | A1 * | 12/2006 | Ferrari et al. .................. | 297/336 |
| 2011/0127822 | A1 * | 6/2011 | Moegling et al. ........ | 297/378.12 |

FOREIGN PATENT DOCUMENTS

JP 2010-83343 4/2010

* cited by examiner

*Primary Examiner* — Milton Nelson, Jr.
(74) *Attorney, Agent, or Firm* — Greenblum & Bernstein, P.L.C.

(57) ABSTRACT

A vehicle seat is provided with an operation member operated to tilt a seatback forward and disposed at such a position as to be operated from behind a seat body. The vehicle seat includes: an operation link connected at one end to the operation member and operated to be pivoted; a link mechanism that is pivotally connected to a lower end of the operation link, receives force, generated by an operation of the operation member, from the operation link to be moved, and outputs the force for cancelling fixation of a reclining angle of the seatback; and a torsion spring that is wound around a pivotally-connected portion at which the link mechanism is pivotally connected to the operation link, and biases the operation link such that the operation link is pivoted toward an initial position in which the operation link is located before being operated.

5 Claims, 7 Drawing Sheets

VEHICLE SEAT

INCORPORATION BY REFERENCE

The disclosure of Japanese Patent Application No. 2011-111183 filed on May 18, 2011 including the specification, drawings and abstract is incorporated herein by reference in its entirety.

BACKGROUND OF THE INVENTION

1. Field of the Invention

The invention relates to a vehicle seat. More specifically, the invention relates to a vehicle seat in which an operating member that is operated to tilt a seatback forward is fitted to a seat body such that the operating member is operated from behind the seat body.

2. Description of Related Art

There is a conventional vehicle seat that is structured to allow a rear-seat occupant to perform an operation for switching an operation mode to a walk-in mode in which a front seat is tilted and slid forward (hereinafter, referred to as "walk-in operation"). Japanese Patent Application Publication No. 2010-83343 (JP 2010-83343 A) describes a structure in which an operating member used to perform the walk-in operation is disposed at a side portion of a lower rear portion of a front seat. The operating member is coupled via a link mechanism to an operating shaft of a reclining mechanism that maintains a fixed reclining angle of a seatback. Owing to the link mechanism, an occupant is able to cancel the lock state of the reclining mechanism with a weak operating force to perform the walk-in operation. After completion of the operation, the operating member is returned to its original position in which the operating member is located before the operation, by a biasing force of a tension spring that is hooked on the link mechanism.

In the structure described in JP 2010-83343 A, the tension spring is used to bias two links, which are linked to each other, in such directions that the links move away from each other, that is, such directions that an angle between the two links increases. More specifically, the links have protruding portions that protrude in the respective directions in which the links move away from each other, and the ends of the tension spring are hooked on the respective protruding portions. Specifically, in one of the links, the tension spring is hooked on the protruding portion that is located at a position further outward than a connecting point, at which the links are connected to each other, in a direction in which the link extends. Accordingly, the required length of the link is longer than the length of a portion of the link, which actually transmits force, that is, an effective link length. This makes it difficult to obtain an effective link length that is long enough to further reduce an operating force required to operate the operating member.

SUMMARY OF THE INVENTION

It is an object of the invention to increase an effective link length to reduce an operating force required to operate an operating member that is operated from behind a seat body to tilt a seatback forward.

An aspect of the invention relates to a vehicle seat that includes a seat body constructed of a seatback and a seat cushion, and an operating member that is operated to tilt the seatback forward and that is disposed at such a position as to be operated from behind the seat body. The vehicle seat includes: an operation link that is connected at a first end to the operating member and that is operated to be pivoted; a link mechanism that is pivotally connected to a second end of the operation link, that receives force, generated by an operation of the operating member, from the operation link to be moved, and that outputs the force for cancelling fixation of a reclining angle of the seatback; and a torsion spring that is wound around a pivotally-connected portion at which the link mechanism is pivotally connected to the second end of the operation link, and that biases the operation link such that the operation link is pivoted toward an initial position in which the operation link is located before being operated.

According to the aspect described above, because the torsion spring is employed as a spring that biases the operation link such that the operation link is pivoted toward the initial position in which the operation link is located before being operated, a spring installation space is reduced as compared with the case where a spring such as a tension spring or a compression spring, which linearly deforms, is used. In addition, it is possible to minimize the problem that the effective link length of the operation link is reduced due to a restriction on a spring hook position. That is, when, for example, a spring that deforms linearly is used, the spring hook position may have to be set at a portion that is further outward than the pivotally-connected portion, at which the operation link is connected to the link mechanism, in the direction in which the operation link extends, depending on the direction in which the operation link is biased to be pivoted. This makes it difficult to set the pivotally-connected portion at the end of the operation link. Therefore, the effective link length utilized to reduce an operating force required to operate the operating member may not be sufficiently long. In contrast to this, because the torsion spring is wound around the pivotally-connected portion, it is possible to set the pivotally-connected portion at the end of the operation link. Thus, the above-described problem no longer occurs, and a sufficiently long effective link length of the operation link, which is utilized to reduce an operating force required to operate the operating member, is obtained. As a result, it is possible to appropriately reduce an operating force.

In the aspect described above, the vehicle seat may further include a release link that is connected to a release shaft which is operated to cancel fixation of the reclining angle of the seatback, and is disposed to extend rearward in substantially a front-rear direction of the seat body. The operating member may be structured to be pulled rearward in the front-rear direction of the seat body. The operation link may extend downward from a connecting point, at which the operation link is connected to the operating member, and have a shape that is elongated in a height direction of the vehicle seat. The link mechanism may be structured to connect a lower end of the operation link to a rear end of the release link to transmit the force, generated by the operation of the operating member, to the release link.

With the above-described structure in which the operation member and the release link extend in the same direction, and the operation link extends downward from the connecting point, at which the operation link is connected to the operating member, and has a shape that is elongated in the height direction of the vehicle seat, it is possible to appropriately reduce the operating force required to operate the operating member to cause a pivot motion of the release link.

In the above structure, the release link may extend also forward in the front-rear direction of the seat body, and may be structured such that an occupant seated in the seat body is able to operate a front portion of the release link to cancel fixation of the reclining angle of the seatback while remaining seated. The second end of the operation link and the link mechanism may be connected to each other in the following manner. When the operating member is operated, a contacting portion of the second end and a contacting portion of the link mechanism contact each other so that the force, generated by the operation of the operating member, is transmitted between the second end of the operation link and the link mechanism. On the other hand, when the front portion of the release link is operated, the contacting portion of the second end and the contacting portion of the link mechanism move away from each other so that force, generated by the operation of the front portion of the release link, is not transmitted between the second end of the operation link and the link mechanism.

Due to the above-described structure of the release link, the occupant seated in the seat body is able to operate the release link while remaining seated to cancel fixation of the reclining angle of the seatback. During the operation, the force, generated by the operation of the release link, is relieved without being transmitted from the link mechanism to the operation link. Therefore, a biasing force of the torsion spring which acts on the operation link is not applied to the release link. Therefore, it is possible to operate the release link with weak force.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereafter, an embodiment of the invention will be described with reference to the accompanying drawings.

Figure 1:
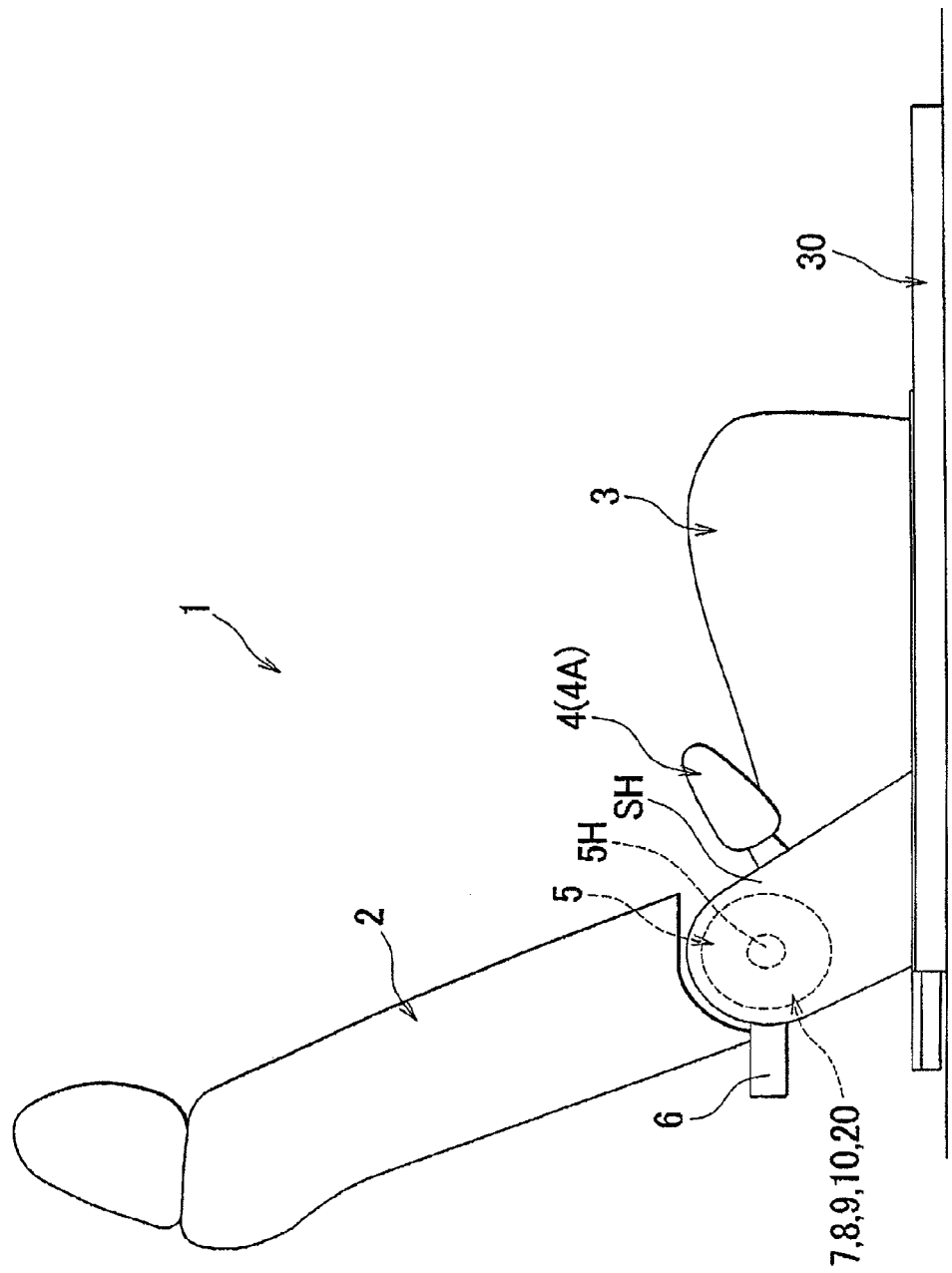
FIG. 1 is a side view schematically showing the structure of a vehicle seat according to an embodiment of the invention.
Figure 2:
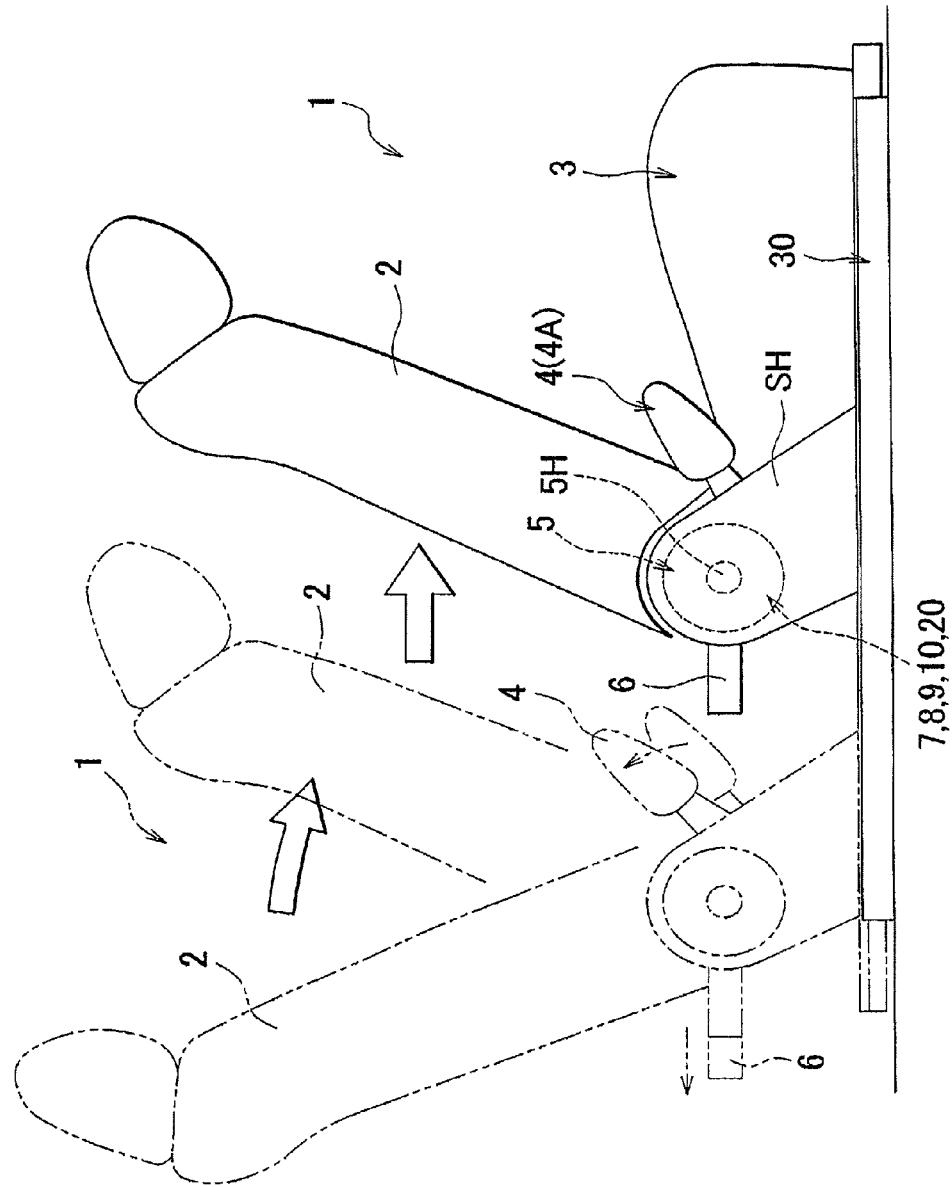
FIG. 2 is a side view showing a state where the vehicle seat is operated to be placed in a walk-in mode.
Figure 3:
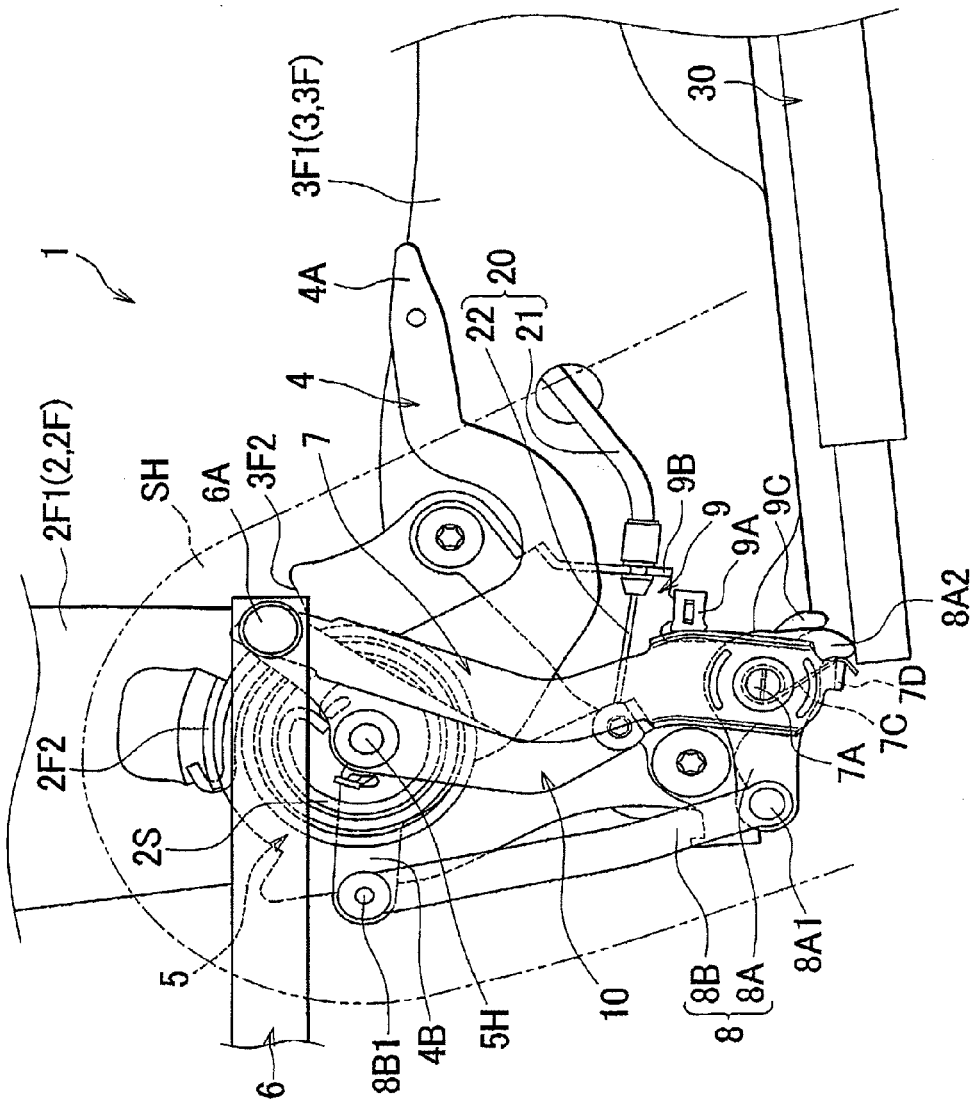
FIG. 3 is an enlarged side view showing an initial state of a link mechanism.
Figure 4:
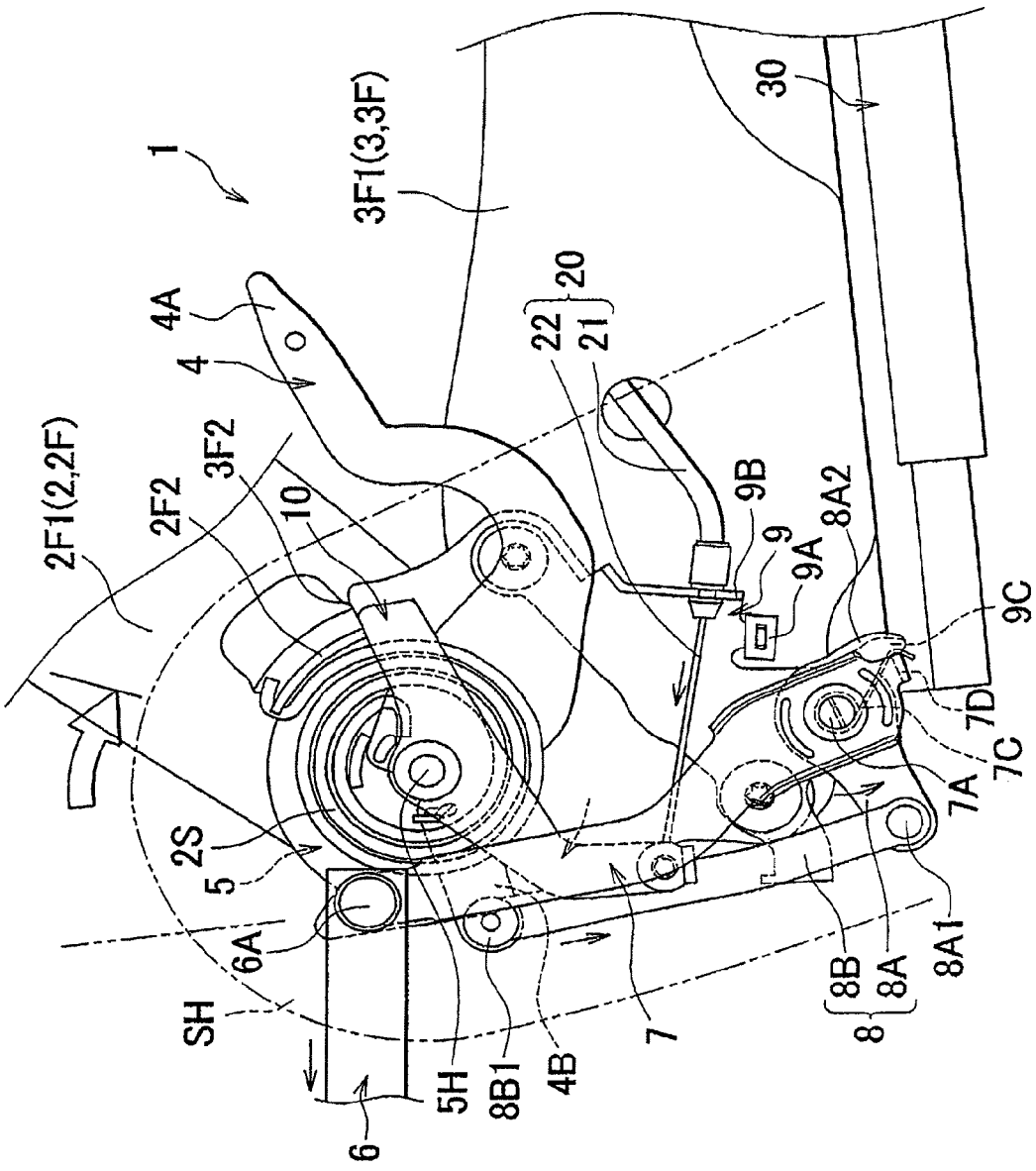
FIG. 4 is a side view showing a state in which an operating member has been operated from the state shown in FIG. 3.
Figure 5:
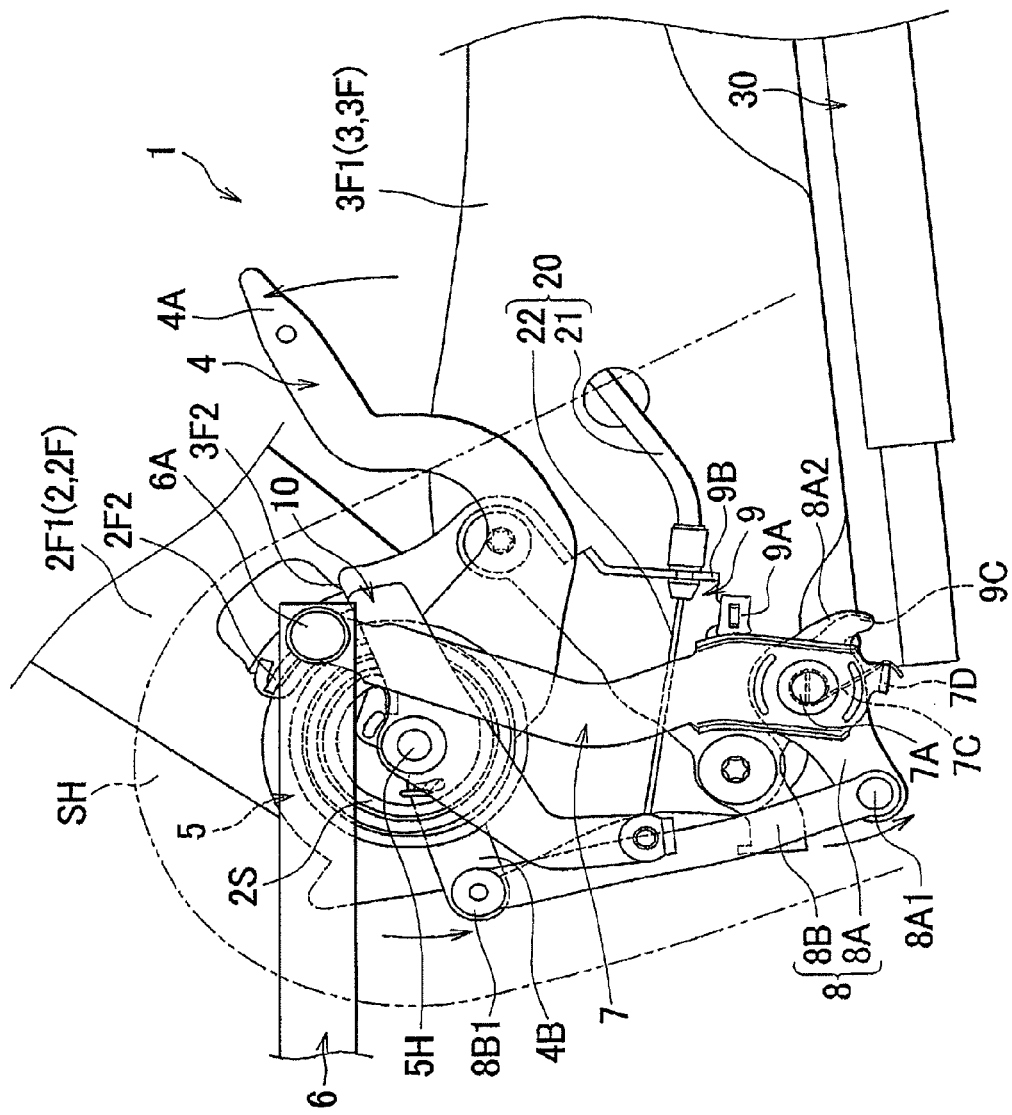
FIG. 5 is a side view showing a state in which a release lever has been operated from the state shown in FIG. 3.
Figure 6:
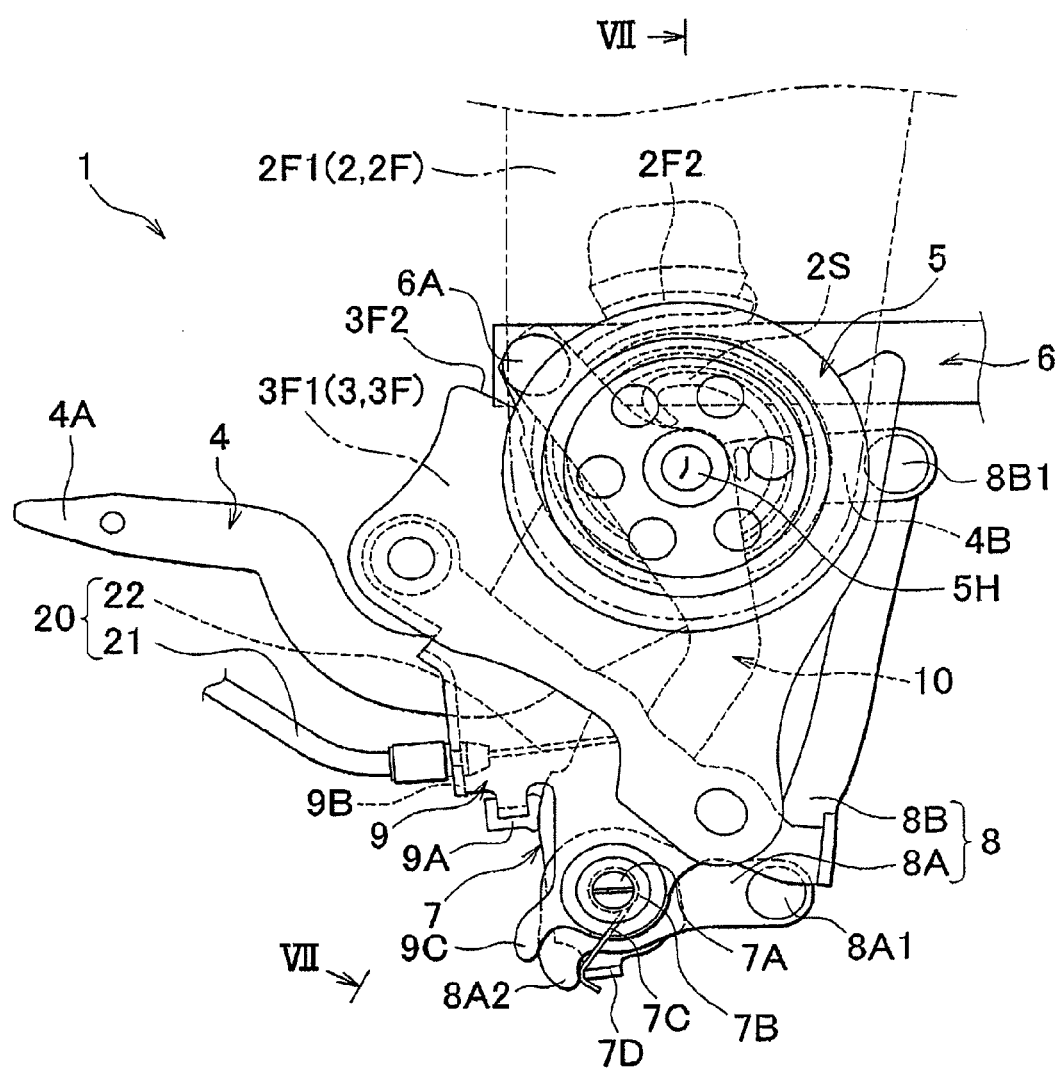
FIG. 6 is a side view showing the initial state of the link mechanism viewed from a direction opposite to the direction from which the link mechanism is viewed in FIG. 3.

First, the structure of a vehicle seat according to an embodiment of the invention will be described with reference to FIG. 1 through FIG. 7. The vehicle seat according to the present embodiment is structured, as shown in FIG. 1, as a seat in a second row behind a driver's seat of a vehicle provided with seats arranged in three rows. A seat body 1, which is the vehicle seat according to the present embodiment, includes a seatback 2 and a seat cushion 3. The seatback 2 is constructed of a seatback frame 2F that constitutes a framework of the seatback 2, and the seatback frame 2F includes right and left side frames 2F1, 2F1. The seat cushion 3 is constructed of a seat cushion frame 3F that constitutes a framework of the seat cushion 3, and the seat cushion frame 3F includes right and left side frames 3F1, 3F1. As shown in FIG. 3, a lower end of each side frame 2F1 of the seatback frame 2F is coupled to a rear end portion of a corresponding one of the side frames 3F1, 3F1 of the seat cushion frame 3F via a corresponding one of reclining mechanisms 5, 5. As shown in FIG. 6, although a part of a rear end portion of each side frame 3F1 of the seat cushion frame 3F is coupled to the seatback frame 2F to move together with the seatback frame 2F, the part conceptually constitutes a part of the structure of the seatback frame 2F. As shown in FIG. 3, the reclining mechanisms 5, 5 usually (in a normal state) prohibit the seatback frame 2F from pivoting with respect to the seat cushion frame 3F to maintain a fixed reclining angle of the seatback 2 (the reclining mechanisms 5 are held in a lock state). A release lever 4 is disposed at one side portion of the seat cushion 3, the one side portion being further outward than the other side portion in the vehicle lateral direction. Through an operation of pulling up the release lever 4, the lock state of the reclining mechanisms 5, 5 is cancelled all at once and the reclining angle of the seatback 2 becomes adjustable.

Each of reclining mechanisms 5, 5 is formed in a generally disc shape, and release shafts 5H, 5H pass through the respective axes of the reclining mechanisms 5, 5. Through an operation of rotating the release shafts 5H, 5H, the lock state of the reclining mechanisms 5, 5 is cancelled. The release shafts 5H, 5H are coupled to each other via a connecting rod (not shown) so as to move together with each other, and the release lever 4 is coupled to an outer end of one of the release shafts 5H, 5H, which is located further outward than the other release shaft 5H in the vehicle lateral direction. With this structure, in the normal state before the release lever 4 is pulled up, the reclining mechanisms 5, 5 are held in the lock state (non-rotatable state). As shown in FIG. 5, through an operation of pulling up the release lever 4, the release shafts 5H, 5H are rotated all at once via the connecting rod (not shown) to cancel the lock state (non-rotatable state) of the reclining mechanisms 5, 5. When the operation of pulling up the release lever 4 is canceled, the reclining mechanism 5, 5 are returned all at once to the lock state (non-rotatable state) by a biasing force of a spring that will be described later in detail. As a result, the reclining angle of the seatback 2 is fixed again.

The seatback 2 is always biased in such a direction as to be tilted forward about the axes of the reclining mechanisms 5, 5, by biasing forces of spiral springs 2S, 2S that are interposed between and hooked on the right and left side frames 2F1, 2F1 of the seatback 2 and the right and left side frames 3F1, 3F1 of the seat cushion 3, respectively. An inner end of the spiral spring 2S is hooked on and fixed to the side frame 3F1 of the seat cushion 3. An outer end of the spiral spring 2S is hooked on an L-shaped plate 2F2 that is connected to an outer side surface of the side frame 2F1 of the seatback 2. Specifically, the outer end of the spiral spring 2S is hooked on and fixed to a rear edge of a plate portion of the L-shaped plate 2F2, the plate portion protruding outward in the vehicle lateral direction. With this structure, when the lock state of the reclining mechanism 5, 5 is cancelled, the seatback 2 is pushed against the back of a seated occupant by the biasing forces of the spiral spring 2S, 2S and follows the back-and-forth movement of the seated occupant. In this way, the reclining angle is adjusted As shown in FIG. 2 and FIG. 5, the seatback 2 is tilted forward by the biasing forces of the spiral spring 2S, 2S when the lock state of the reclining mechanisms 5, 5 is cancelled with no occupant seated in the seat body 1. Then, the seatback 2 is stilted forward until front edges of the L-shaped plates 2F2, 2F2 contact stopper projections 3F2, 3F2 that are formed on the side frames 3F1, 3F1 of the seat cushion 3. Thus, the seatback 2 stops tilting. The position at which the seatback 2 stops tilting is a forward tilting position of the seatback 2. A pulling link 10 is pivotally supported by one of the side frames 3F1, 3F1 of the seat cushion 3, which is located further outward than the other side frame 3F1 in the vehicle lateral direction. As shown in FIG. 5, as the seatback 2 is tilted forward, the pulling link 10 is pushed forward by the L-shaped plate 2F2, located further outward than the other L-shaped plate 2F2 in the vehicle lateral direction, and thus a cable 20 that is connected to a lower end of the pulling link 10 is pulled. When the cable 20 is pulled, a slide-lock state of a slider device 30, via which the seat body 1 is slidably connected to a vehicle floor, is cancelled. As a result, as shown in FIG. 2, the seat body 1 is allowed to slide forward with the seatback 2 tilted forward. Subsequently, the seat body 1 is pushed forward. In this way, it is possible to place the seat body 1 in a so-called walk-in mode where a wide space through which the occupant gets on and off the rear seat is obtained. Hereinafter, a series of operations described above will be referred to as "walk-in operation". Note that because the structure of the slider device 30 and the structure for achieving the slide-lock state are known, the detailed description thereof will be omitted.

The walk-in operation on the seat body 1 shown in FIG. 2 is performed, for example, when a user holds and pulls up the release lever 4 while standing at a position outside a vehicle door located on the outer side of the seat body 1. The walk-in operation may be performed also by an occupant seated in a vehicle seat behind the seat body 1, that is, the walk-in operation may be performed from behind the seat body 1. That is, when the occupant seated in the rear seat intends to get off the vehicle, the occupant is able to perform an operation for sliding the front seat (seat body 1) forward to widen the space, through which the occupant gets off the vehicle, while remaining seated. Specifically, an operation strap 6 that is pulled from behind the seat body 1 is disposed at a rear portion of the seat body 1. The operation strap 6 is disposed so as to be drawn rearward (rearward in the front-rear direction of the seat body 1) out of the seat body 1. When the occupant seated in the rear seat pulls the operation strap 6 rearward (rearward in the front-rear direction of the seat body 1), as is the case where the release lever 4 is operated, the lock state of the reclining mechanisms 5, 5 is cancelled and the seat body 1 is placed in the walk-in mode. Note that, the operation strap 6 may function as "operating member" according to the invention. The operation strap 6 is connected to the release lever 4, and structured to pull the release lever 4 up when being pulled. In order to allow the occupant to pull the operation strap 6 with a weak force, the operation strap 6 is connected to the release lever 4 via an operation link 7 and a link mechanism 8.

Figure 7:
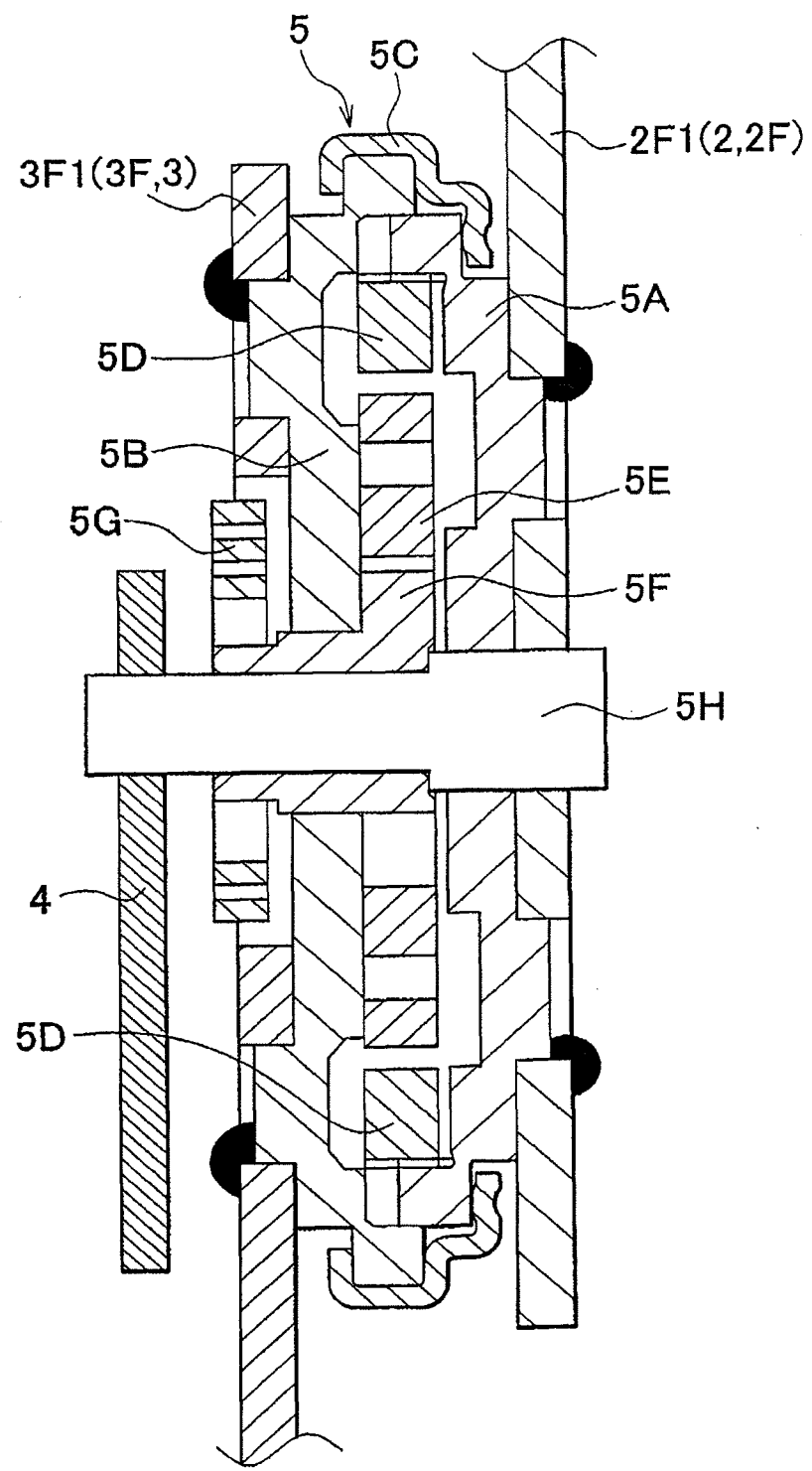
FIG. 7 is a sectional view showing a sectional structure of a reclining mechanism, taken along the line VII-VII in FIG. 6.

Hereafter, the structures for operating the release lever 4 and the operation strap 6 and the detailed structure of the reclining mechanisms 5, 5 operated by these operating members will be described. First, the structure of the reclining mechanisms 5, 5 will be described. The reclining mechanisms 5, 5 are oriented to be bilaterally symmetric with each other, and the basic structures of the reclining mechanisms are the same. Therefore, only the structure of the reclining mechanism 5 on one side will be described. The reclining mechanism 5 includes a disc-shaped ratchet 5A, and a disc-shaped guide 5B, as shown in FIG. 7. The ratchet 5A is placed on and welded to the outer side surface of the side frame 2F1 of the seatback 2. The guide 5B is placed on and welded to an inner side surface of the side frame 3F1 of the seat cushion 3. The ratchet 5A and the guide 5B are fitted to each other in the axial direction so as to be rotatable relative to each other, and an outer ring 5C prohibits the ratchet 5A and the guide 5B from being separated from each other in the axial direction. Between the ratchet 5A and the guide 5B, there are disposed two pawls 5D, 5D that have external teeth; a hinge cam 5F that is supported by an axis portion of the guide 5B, and a slide cam 5E that is slid by the axial rotation of the hinge cam 5F. The two pawls 5D, 5D are pushed to be meshed with the ratchet 5A via the slide cam 5E and disengaged from the ratchet 5A, whereby relative rotation between the ratchet 5A and the guide 5B is prohibited and allowed, respectively.

The hinge cam 5F is usually (in the normal state) biased to be rotated by a biasing force of a spiral spring 5G that is disposed between and hooked on the hinge cam 5F and the guide 5B, and keeps the pawls 5D, 5D meshed with the ratchet 5A. Thus, in the normal state, relative rotation between the ratchet 5A and the guide 5B is prohibited in the reclining mechanism 5 (the reclining mechanism 5 is in the non-rotatable state). Thus, the reclining mechanism 5 maintains the fixed reclining angle of the seatback 2. The release shaft 5H that rotates together with the hinge cam 5F passes through the axis of the hinge cam 5F. When the release shaft 5H is rotated in response to an operation of the release lever 4, the hinge cam 5F is rotated against the biasing force of the spiral spring 5G to disengage the pawls 5D, 5D from the ratchet 5A. Thus, the non-rotatable state where relative rotation between the ratchet 5A and the guide 5B is prohibited is cancelled (the lock state of the reclining mechanism 5 is cancelled), and therefore the reclining angle of the seatback 2 becomes adjustable. When the operation of pulling up the release lever 4 is cancelled (that is, when the release lever 4 is released), the hinge cam 5F causes the pawls 5D, 5D to mesh with the ratchet 5A again and keeps the pawls 5D, 5D meshed with the ratchet 5A under the biasing force of the spiral spring 5G.

Next, the structure of the release lever 4 will be described with reference to FIG. 3. The release lever 4 is connected to the outer end of the release shaft 5H that is located further outward than the other release shaft 5H in the vehicle lateral direction so as to move together with the release shaft 5H. The release lever 4 is elongated in the front-rear direction of the seat body 1, and has a front arm 4A that extends toward the front of the seat body 1 and a rear arm 4B that extends toward the rear of the seat body 1. Note that, the release lever 4 may function as "release link" according to the invention, and the front arm 4A may function as "front portion" according to the invention. The front arm 4A extends up to a prescribed position within reach of the occupant seated in the seat body 1. The height of a tip portion of the front arm 4A that is held by the occupant during the operation of the release lever 4 is set to be substantially equal to (or slightly less than) the height of the release shaft 5H that is the pivot axis of the release lever 4. With this structure, when the seated occupant holds and pulls up the front arm 4A, the release lever 4 is smoothly (easily) pivoted, and therefore the occupant is able to easily pull the release lever 4 up to a specified position almost without need to twist his/her hand that holds the release lever 4.

Next, the structure for operating the operation strap 6 will be described. The operation strap 6 is arranged to be drawn rearward out of a slit (not shown) that is formed on a rear surface of one of resin shields SH, SH, which is arranged further outward than the other resin shield SH in the vehicle lateral direction. The shields SH, SH cover, from outside of the seat body 1, portions where the seatback 2 and the seat cushion 3 are coupled to each other and which are located on the right and left sides of the seat body 1. Specifically, the operation strap 6 is drawn rearward out of the shield SH from a relatively high position within the shield SH. Therefore, the operation strap 6 is disposed at such a height that the occupant seated in the rear seat is able to relatively easily reach the operation strap 6. More specifically, the operation strap 6 is drawn rearward out of the shield SH from a position higher than the position of the release shaft 5H that is the pivot axis of the release lever 4, and an upper end of the operation link 7 is connected to a front end of the operation strap 6, which is covered with the shield SH. Via the operation link 7 and the link mechanism 8 that is connected to a lower end of the operation link 7, the operation strap 6 is connected to the rear arm 4B of the release lever 4 so as to transmit force to the rear arm 4B.

The operation link 7 is disposed to be elongated in the seat height direction. The lower end of the operation link 7 is pivotally connected, with a connecting pin 7A, to a base 9 that is fixed to the outer side surface of the side frame 3F1 of the seat cushion 3, and the upper end of the operation link 7 is pivotally connected to the front end of the operation strap 6 with a connecting pin 6A. Specifically, the lower end of the operation link 7 is connected to the base 9 so as to be able to pivot about the connecting pin 7A, and the connecting pin 7A is fixed on the base 9. A spiral torsion spring 7C that always biases the operation link 7 such that the operation link 7 pivots forward is hooked on a portion of the connecting pin 7A, to which the lower end of the operation link 7 is connected.

The torsion spring 7C is a spiral spring, and wound around the connecting pin 7A as described above. As shown in FIG. 6, an inner end of the torsion spring 7C is fixedly inserted in a slit formed in a shaft portion of the connecting pin 7A, and prevented from coming out of the connecting pin 7A by a washer 7B that is fitted on the shaft portion of the connecting pin 7A. An outer end of the torsion spring 7C is hooked on and fixed to a front edge of a pushing piece 7D which is formed at the lower end of the operation link 7 and extends in the axial direction of the connecting pin 7A. With this structure, as shown in FIG. 3, the operation link 7 is usually biased to pivot clockwise in FIG. 3 about the connecting pin 7A by the biasing force of the torsion spring 7C, and contacts and engages with a rubber stopper 9A that is attached to the base 9. The operation link 7 is pivoted counterclockwise in FIG. 3 when the operation strap 6 connected to the upper end of the operation link 7 is pulled rearward (rearward in the front-rear direction of the seat body 1) against the biasing force of the torsion spring 7C. The pivot motion of the operation link 7 is stopped, as shown in FIG. 4, at a position at which the pushing piece 7D that is formed at the lower end of the operation link 7 contacts a stopper piece 9C that is formed on the base 9.

As shown in FIG. 3, the operation link 7 is disposed to be elongated in the seat height direction that is substantially perpendicular to the direction in which the operation strap 6 is operated. The lower end of the operation link 7 (connecting pin 7A) is set at a position which is as low as possible but at which the operation link 7 does not contact the slider device 30 disposed below the seat cushion 3. The upper end of the operation link 7 (connecting pin 6A) is at a position that is in front of and above the release shaft 5H in the initial state before the operation strap 6 is operated. When the operation strap 6 is pulled rearward, the upper end of the operation link 7 moves, on the outside of the side frame 2F1, from a front edge to a rear edge of the side frame 2F1 (moves to a position where the pushing piece 7D contacts and engages with the stopper piece 9C that is formed on the base 9, as described above with reference to FIG. 4). During the movement, the upper end of the operation link 7 passes by the above-described L-shaped plate 2F2 that is disposed on the side frame 2F1 of the seatback 2. Thus, the operation link 7 pivots within a region inside the shield SH which is arranged on one side of the seat body 1, the side being further outward than the other side in the vehicle lateral direction. With this structure, the height of the region inside the shield SH is maximally utilized to obtain a long effective link length of the operation link 7. Accordingly, it is possible obtain the structure with which a load of pulling the operation strap 6 rearward is significantly reduced.

The lower end of the operation link 7 is connected to the rear arm 4B of the release lever 4 via the link mechanism 8 that includes a first link 8A and a second link 8B. The first link 8A is disposed to extend in the front-rear direction of the seat, which is substantially perpendicular to the direction in which the operation link 7 extends. A front end of the first link 8A is pivotally connected to the connecting pin 7A, and a rear end of the first link 8A is pivotally connected to a lower end of the second link 8B with a connecting pin 8A1. The second link 8B is disposed to extend in substantially the same direction as the direction in which the operation link 7 extends (that is, the seat height direction). The lower end of the second link 8B is pivotally connected to the rear end of the first link 8A with the connecting pin 8A1, and an upper end of the second link 8B is pivotally connected to the rear end of the rear arm 4B of the release lever 4 with a connecting pin 8B1.

When the operation link 7 is held at the initial position as shown in FIG. 3, both the first link 8A and the second link 8B are suspended between the operation link 7 and the rear arm 4B of the release lever 4 that is held at the initial position and pivot motions of the first link 8A and the second link 8B are prevented. When the operation strap 6 is pulled rearward and the operation link 7 is pivoted counterclockwise in the drawing, a leg piece 8A2, formed at the front end of the first link 8A so as to project downward, is pushed by the pushing piece 7D of the operation link 7 in the direction in which the pushing piece 7D moves. At the same time, the second link 8B that is connected to the first link 8A is pulled downward. Thus, the rear arm 4B of the release lever 4 is pulled downward, and the release lever 4 is pivoted as is the case where the front arm 4A is directly held and operated by the occupant. In this way, the lock state of the reclining mechanisms 5, 5 is cancelled. At this time, an operation of pulling the operation strap 6 rearward is performed with a weak force, because the operation link 7 and the link mechanism 8, disposed between the operation strap 6 and the reclining mechanisms 5, 5, extend in substantially the seat height direction (that is, the direction substantially perpendicular to the direction in which the operation strap 6 is pulled) and the effective link lengths of the operation link 7 and the link mechanism 8 are both set to be long.

Specifically, the height of the rear end portion of the rear arm 4B of the release lever 4 is set to be substantially equal to (or slightly greater than) the height of the release shaft 5H that is the pivot axis of the release lever 4. Therefore, the release lever 4 is smoothly (easily) pivoted as the second link 8B is pulled downward. In other words, the operating force is reduced by setting the effective link length of the operation link 7 to be long. On the other hand, when the effective link length of the operation link 7 becomes long, an operation amount (travel amount) of the operation strap 6 increases. With this structure, however, it is possible to pivot the release lever 4 up to a prescribed position with a small operation amount (travel amount) of the operation strap 6.

The operation link 7 and the link mechanism 8 are structured such that when the front arm 4A is directly held and pulled up as shown in FIG. 5, an operating force that is transmitted from the release lever 4 is relieved so as not to be transmitted from the link mechanism 8 to the operation link 7. Specifically, even when the front arm 4A is pulled up, the second link 8B is pushed down, and the first link 8A is pivoted counterclockwise in FIG. 5 about the connecting pin 7A, the leg piece 8A2 of the first link 8A moves in a direction away from the pushing piece 7D of the operation link 7. Therefore, the operation link 7 does not pivot, and the operating force is relieved without being transmitted to the operation link 7. The torsion spring 7C, which applies a biasing force as a resistance force when the operation link 7 is pivoted counterclockwise, is hooked on the lower end of the operation link 7. However, when the front win 4A is directly held and pulled up, a spring force of the torsion spring 7C which acts as the resistance force against the operation is not applied to the release lever 4. This prevents an increase in an operating force required to operate the release lever 4.

Therefore, in both the case where the release lever 4 is directly held and operated and the case where the operation strap 6 is pulled from behind the seat body 1, the lock state of the reclining mechanism 5, 5 is cancelled and the seatback 2 is tilted to the forward tilting position. As the seatback 2 is tilted forward, the pulling link 10 that is connected to one of the release shafts 5H, 5H, which is located further outward than the other release shaft 5H in the vehicle lateral direction, is pushed forward by the L-shaped plate 2F2 that is connected to the side frame 2F1 of the seatback 2 and the cable 20 that is connected to the lower end of the pulling link 10 is pulled. As a result, slide-lock state of the slider device 30 is cancelled. The cable 20 has a double structure in which a wire rod 22 is passed through a guide tube 21, an end of the guide tube 21, which is shown in the drawings, is hooked on and fixed to a cable hook 9B that is formed on the base 9, and an end of the wire rod 22, which is drawn out of the end of the guide tube 21, is hooked on the lower end of the pulling link 10.

The other end of the guide tube 21, which is not shown in the drawings, is hooked on and fixed to the side frame 3F1 of the seat cushion 3, and an end of the wire rod 22 on this side is connected to a member that operates a slide lock mechanism (not shown) of the slider device 30. Thus, when the seatback 2 is tilted to the forward tilting position and the pulling link 10 is pushed forward, the wire rod 22 of the cable 20 connected to the lower end of the pulling link 10 is further drawn out of the guide tube 21, and the slide lock mechanism of the slider device 30, which is connected to the other end of the wire rod 22, is operated to cancel the slide-lock state of the slider device 30. When the seatback 2 is raised up to the position in which the seatback 2 is located before the pulling link 10 is pushed forward, the cable 20 is no longer pulled and the slider device 30 is returned to the slide-lock state by a biasing force of a spring (not shown).

With the structure of the vehicle seat according to the present embodiment, because the torsion spring 7C is employed as a spring that biases the operation link 7 such that the operation link 7 is pivoted to the initial position in which the operation link 7 is located before being operated, a spring installation space is reduced as compared with the case where a spring such as a tension spring or a compression spring, which linearly deforms, is used. In addition, it is possible to minimize the problem that the effective link length is reduced due to a restriction on a spring hook position. That is, when, for example, a compression spring or a tension spring that deforms linearly is used, the position at which the spring is hooked on the operation link 7 may have to be set at a portion that is further downward than a position, at which the operation link 7 is pivotally connected to the link mechanism 8 (hereinafter, referred to as "pivotally-connected position") and which is set in the lower portion of the operation link 7 (connecting pin 7A), depending on the direction in which the operation link 7 is biased to be pivoted. This makes it difficult to set the pivotally-connected position of the operation link 7 (the position of the connecting pin 7A) at the lower end of the operation link 7 (link end). Therefore, the effective link length utilized to reduce an operating force required to operate the operation strap 6 may not be sufficiently long. In contrast to this, because the torsion spring 7C is wound around the connecting pin 7A, it is possible to set the pivotally-connected position of the operation link 7 (the position of the connecting pin 7A) at the lower end of the operation link 7 (link end). Thus, the above-described problem no longer occurs, and a sufficiently long effective link length of the operation link 7, which is utilized to reduce an operating force required to operate the operation strap 6, is obtained. As a result, it is possible to appropriately reduce an operating force.

Furthermore, the operation strap 6 is structured to be pulled rearward (rearward in the front-rear direction of the seat body 1), and the release lever 4 (rear arm 413), which is connected to the release shaft 5H operated to cancel fixation of the reclining angle of the seatback 2, is disposed to extend in substantially the same direction as the direction in which the operation strap 6 is operated. The operation link 7 is structured to have an effective link length that is long in the seat height direction and that extends downward from the connecting point, at which the operation link 7 is connected to the operation strap 6. The link mechanism 8 is structured to connect the lower end of the operation link 7 to the rear end of the release lever 4 to transmit the operating force applied to the operation strap 6 to the release lever 4. With the structure in which the operation strap 6 and the release lever 4 extend in the same direction, and the operation link 7 has the effective link length that is long in the seat height direction and that extends downward from the connecting point, at which the operation link 7 is connected to the operation strap 6 (connecting pin 6A), it is possible to appropriately reduce an operating force required to operate the operation strap 6 to cause a pivot motion of the release lever 4.

While an embodiment of the invention has been described above, the invention may be implemented in various other embodiments. For example, the operation strap 6 that is pulled rearward is described as an example of "operating member" according to the invention; however, the operating member need not be a strap that is pulled. For example, a member that is slid in the up-down direction, a member that is slid in the lateral direction, or a member that is pushed forward may be employed as the operating member according to the invention.

The operation link may be disposed such that the effective link length extends upward from a position at which the operation link is connected to the operating member. However, this structure is not preferable because the size of a shield that covers an installation site of the operation link may increase. The structure of the link mechanism is not particularly limited as long as the operation link and the release link are connected to each other such that force is able to be transmitted therebetween. For example, the link mechanism may include a single link. In that case, a long hole in a specified shape may be formed in one of the pivotally-connected portions, so that force transmission between the links is performed smoothly without any interference. Furthermore, the installation position of the operating member need not be particularly limited as long as the operating member is arranged at such a position as to be operated from behind the seat body. The installation position in the height direction or the width direction of the seat body is not particularly limited.

What is claimed is:

1. A vehicle seat that includes a seat body constructed of a seatback and a seat cushion, and an operating member that is operated to tilt the seatback forward and that is disposed at such a position as to be operated from behind the seat body, comprising:

an operation link that is connected at a first end to the operating member and that is configured to be pivoted in operation;

a link mechanism that is pivotally connected to a second end of the operation link, that is configured to receive a force, generated by an operation of the operating member, from the operation link to be moved, and that outputs the force for cancelling fixation of a reclining angle of the seatback; and a torsion spring that is wound around a pivotally-connected portion at which the link mechanism is pivotally connected to the second end of the operation link, and that biases the operation link such that the operation link is pivoted toward an initial position in which the operation link is located before being operated.

2. The vehicle seat according to claim 1, further comprising:

a release link that is connected to a release shaft which is operable to cancel fixation of the reclining angle of the seatback, and is disposed to extend rearward in substantially a front-rear direction of the seat body, wherein, the operating member is structured to be pulled rearward in the front-rear direction of the seat body, the operation link extends downward from a connecting point, at which the operation link is connected to the operating member, and has a shape that is elongated in a height direction of the vehicle seat, and the link mechanism is structured to connect a lower end of the operation link to a rear end of the release link to transmit the force, generated by the operation of the operating member, to the release link.

3. The vehicle seat according to claim 2, wherein the release link extends forward in the front-rear direction of the seat body, and is structured such that an occupant seated in the seat body is able to operate a front portion of the release link to cancel fixation of the reclining angle of the seatback while remaining seated, and the second end of the operation link and the link mechanism are connected to each other such that when the operating member is operated, a contacting portion of the second end and a contacting portion of the link mechanism contact each other so that the force, generated by the operation of the operating member, is transmitted between the second end of the operation link and the link mechanism, whereas when the front portion of the release link is operated, the contacting portion of the second end and the contacting portion of the link mechanism move away from each other so that force, generated by the operation of the front portion of the release link, is not transmitted between the second end of the operation link and the link mechanism.

4. The vehicle seat according to claim 2, wherein a height of a tip of the front portion of the release link is set to be substantially equal to a height of the release shaft that is a pivot axis of the release link.

5. The vehicle seat according to claim 2, wherein the operating member is drawn rearward from a position higher than a position of the release shaft that is a pivot axis of the release link.

* * * * *